(12) United States Patent
Penna Costa

(10) Patent No.: US 10,617,205 B2
(45) Date of Patent: Apr. 14, 2020

(54) SYSTEMS FOR QUICK MOUNTING APPLIED TO A CABINET BODY

(71) Applicant: ITATIAIA MÓVEIS S/A, Ubá MG (BR)

(72) Inventor: Victor Penna Costa, Nova Lima (BR)

(73) Assignee: ITATIAIA MOVEIS S/A, Uba MG (BR)

( * ) Notice: Subject to any disclaimer, the term of this patent is extended or adjusted under 35 U.S.C. 154(b) by 0 days.

(21) Appl. No.: 16/052,309

(22) Filed: Aug. 1, 2018

(65) Prior Publication Data
US 2019/0038021 A1 Feb. 7, 2019

(30) Foreign Application Priority Data

Aug. 2, 2017 (BR) .............................. 102017016574

(51) Int. Cl.
*A47B 47/02* (2006.01)
*F16B 12/08* (2006.01)
*A47B 88/913* (2017.01)

(52) U.S. Cl.
CPC .......... *A47B 47/025* (2013.01); *A47B 88/913* (2017.01); *F16B 12/08* (2013.01); *A47B 2230/16* (2013.01)

(58) Field of Classification Search
CPC . A47B 47/00; A47B 47/0066; A47B 47/0075; A47B 47/02; A47B 47/021; A47B 47/025; A47B 96/201; A47B 2230/16; A47B 2230/0085; A47B 2230/0092; F16B 12/08
See application file for complete search history.

(56) References Cited

U.S. PATENT DOCUMENTS

| | | | | | |
|---|---|---|---|---|---|
| 1,806,610 | A | * | 5/1931 | Christensen | A47B 47/03 312/263 |
| 2,727,800 | A | * | 12/1955 | Snider | A47B 61/00 292/162 |
| 4,077,686 | A | * | 3/1978 | Bukaitz | A47B 47/02 312/107 |
| 4,288,132 | A | * | 9/1981 | Znamirowski | A47B 47/03 248/205.3 |

(Continued)

FOREIGN PATENT DOCUMENTS

| | | | | |
|---|---|---|---|---|
| BR | MU8903064 U2 | * | 6/2011 | |
| DE | 3142882 A1 | * | 5/1983 | ........... A47B 47/025 |

(Continued)

*Primary Examiner* — Andrew M Roersma
(74) *Attorney, Agent, or Firm* — Nath, Goldberg & Meyer; Joshua B. Goldberg

(57) ABSTRACT

The present patent of the invention is applied to the furniture area and refers to a system for bending pieces and system for quick mounting applied to a cabinet body, specially steel cabinets, for joining took-apart pieces through fitting and bending to the steel piece itself causing the pieces to lock one another without needing screws, connectors, tools or skilled labor. The cabinet body presents bipartite backside section of which two pieces are joined by quick fitting in one piece which side section, top and bottom parts fit to, resulting in the box. This box having pieces non-locked yet receives in its four corners simple manual bends at the steel, forming the cabinet box for doors and shelves to be immediately fitted thereto.

2 Claims, 8 Drawing Sheets

(56) References Cited

U.S. PATENT DOCUMENTS

Figure 1:
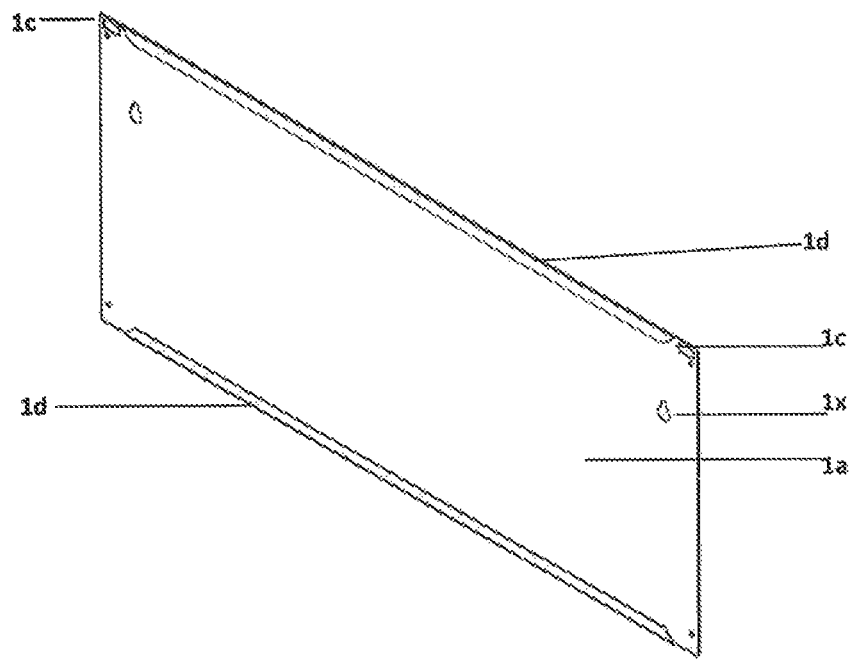

| | | | | |
|---|---|---|---|---|
| 5,221,131 | A * | 6/1993 | Lesperance | A47B 47/025 312/263 |
| 6,099,095 | A * | 8/2000 | Irace | F16B 12/28 220/4.01 |
| 8,042,890 | B2 * | 10/2011 | Collins | A47B 47/0075 312/257.1 |
| 9,510,518 | B2 * | 12/2016 | Shein | A01G 9/02 |
| 2005/0035697 | A1 * | 2/2005 | Chen | A47B 47/02 312/257.1 |
| 2008/0129165 | A1 * | 6/2008 | Chen | A47B 47/0066 312/263 |
| 2013/0020921 | A1 * | 1/2013 | Booth | A47B 47/02 312/352 |
| 2018/0055219 | A1 * | 3/2018 | Lim | A47B 43/00 |
| 2018/0110331 | A1 * | 4/2018 | MacK | A47B 47/025 |

FOREIGN PATENT DOCUMENTS

| | | | | |
|---|---|---|---|---|
| FR | 2822035 | A1 * | 9/2002 | A47B 47/02 |
| GB | 1386977 | A * | 3/1975 | A47B 47/0075 |

* cited by examiner

SYSTEMS FOR QUICK MOUNTING APPLIED TO A CABINET BODY

The present patent invention is applied to furniture area, and refers to a system for bending pieces and a system for quick mounting applied to a cabinet body, specially steel cabinets, for joining took apart pieces by fitting and bending of the steel piece locking the pieces one to another without needing screws, connectors, tools or skilled labor. The cabinet body presents bipartite backside section of which two pieces are joined by quick fitting in one piece which side section, top and bottom parts fit to, resulting in the box. This box having pieces non-locked yet receives in its four corners simple manual bends at the steel, forming the cabinet box for doors and shelves to be immediately fitted thereto.

The mounting systems currently used to mount box of took-apart steel-plated cabinets, specially in the backside section, are fixed by joining the side sections, top and bottom parts to the back part, the side sections, top and bottom parts having bends that when in contact with the backside flat plate are joined using screws and nuts that pass through coincident bores. In another known system, the back part presents a small backlash made by the bend in contact with the side sections, top and bottom parts of the cabinet having U-shaped bends at the backside part and being fixed using screws and nuts or self-tapping screw through coincident bores.

In turn, the systems currently used to installation of cabinets on a wall commonly use a device that is fixed to the backside of the backside section of the cabinet box, which is fitted to a panel having recesses to be fixed to the wall or that will be able to be fixed to the wall using bores on the back part that are positioned at the installation place and fixed through screw and bush.

The document no BR 102014016208-9—entitled "SISTEMA CONSTRUTIVO DE MONTAGEM APLICADO EM ARMÁRIO" (CONSTRUCTIVE MOUNTING SYSTEM APPLIED TO CABINET)—consists of a wooden cabinet, comprising two side plates, a cap, a fixed middle shelf, a bottom plate, a backside plate, a double-sheet door, the wooden cabinet being provided with adjustable shelves, finishing bungs and supporting bungs, bun feet, screws, bulkhead plate and handles. The novelty consists of the fact of being provided with grooved plates, or slots designed for fitting and locking, reducing the fixation using screws, and eliminating weld. It differs from the present system for presenting wooden plates and finishes, and for fitting and locking using screws, while the present patent above described presents a quick-mounting system through pieces of steel plates, the steel having fits and bends on itself.

The document no PI 0603865-4, owned by the Applicant of the present patent, is a CABINET MOUNTING SYSTEM WITH FIXING ELEMENT ("SISTEMA DE MONTAGEM DE ARMÁRIO COM ELEMENTO DE FIXAÇÃO"), presents a structured assembly of bent- or stamped-steel molded pieces, the shape and size substantially corresponding to the fit one another, which will take place concurrently at the moment of mounting, gradually by coupling through a common fixing element. The side profiles are provided with U-shaped bend, holes for fitting the fixing element, in addition to holes for fitting the backside face; central faces or caps. The side profiles are provided with slots for coupling to the U-shaped side parts, hole for fitting the fixing element pin, and coincident hole and for juxtaposition to the hole of the fixing element; the fixing element of the body being provided with a pin at the bottom part in addition to holes, and a fit for receiving a hinge and a screw allowing the hinge of the door to be fixed. After the door having received the hinge fit, this is coupled to the element through the fit and fixed to it by the screw screwed into the hole through the hinge fit. It differs from the present system due to the fixation of the pieces, and the fixation of the cabinet to the wall takes place through screws, fixing pins and element, while the present patent described herein presents a system for quick mounting through steel plate pieces, the steel having fits and bends on itself, dispensing with screws, connectors, tools or skilled labor.

The document no MU 8903064-8—entitled "Disposição construtiva introduzida em dispositivos de montagem e fixação de partes componentes de armário metálico" (Constructive Arrangement inserted into fixing and mounting devices of parts composing metallic cabinet)—presents a fixing and mounting device of the couple of pieces composing the bottom; fixing and mounting device of the pieces composing the side parts joined to the upper crossbar; fixing and mounting device of the shelves joined to the set of racks and fixing and mounting device of the backside part of the top component, new constructive arrangement being inserted into the parts composing right and left side pieces; right and left bottom pieces, rack piece, shelf piece and top piece. It differs from the present system for presenting locking bar, crossbar and extruded column supporting the cabinet structure, while the present patent do not have structural pieces, only steel plate pieces with fits and bends on the steel itself dispensing with screws, connectors, tools or skilled labor.

The system of mounting the steel cabinet box of the present patent consists of loose pieces in steel plates having predefined bends forming parts of backside section, side sections, top part, and bottom part that by only fitting one to another they form the cabinet box having no shelves and doors yet. This box formed by fitted parts being not locked yet will receive simple manual bends at the steel plate, one bend on each of the four corners of the cabinet box where the backside, side part, top or bottom sections are. These bends can be made without needing tools allowing for a simplified and quick mounting that can be performed by any person, thus forming the steel cabinet box locked and sufficiently stiff to receive shelves and doors, if needed.

The systems for quick mounting applied to cabinet body mating a system for bending pieces and a system for quick mounting applied to a cabinet body present the following advantages:

allowing for the quick and secure mounting of the components through bends;

enabling pieces of the cabinet box to be locked in an effective and resistant manner;

providing for fits to the steel itself by means of bends;

allowing for the cabinet body mounting without needing specific connectors and tools;

enabling the cabinet body mounting to be performed by only one person needing no a skilled person.

Figure 2:
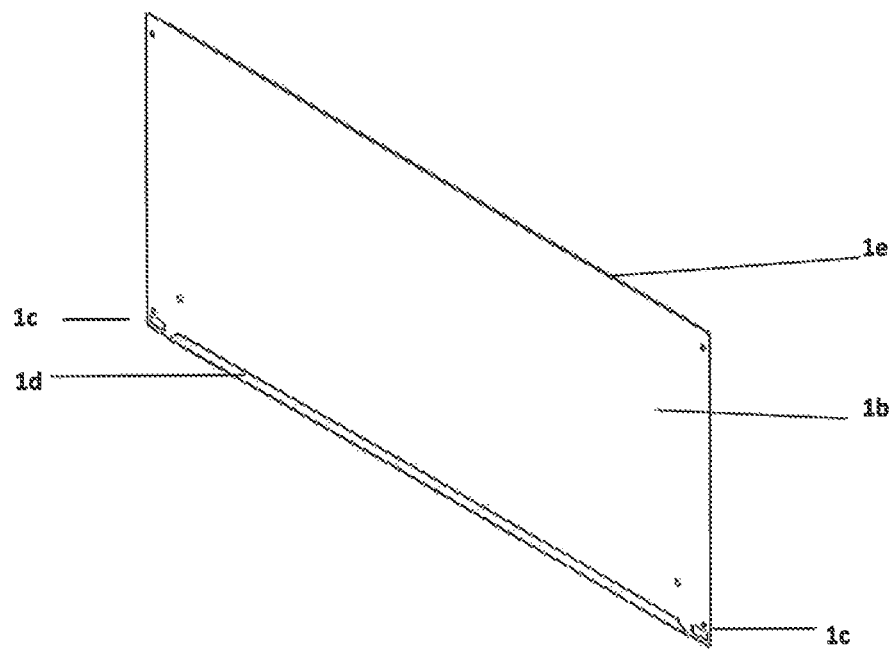
Figure 3:
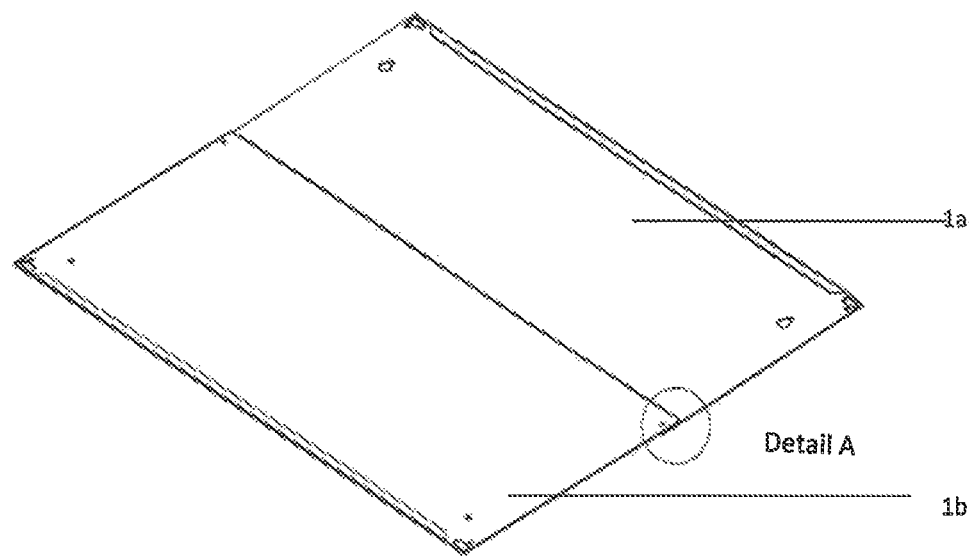
Figure 3:
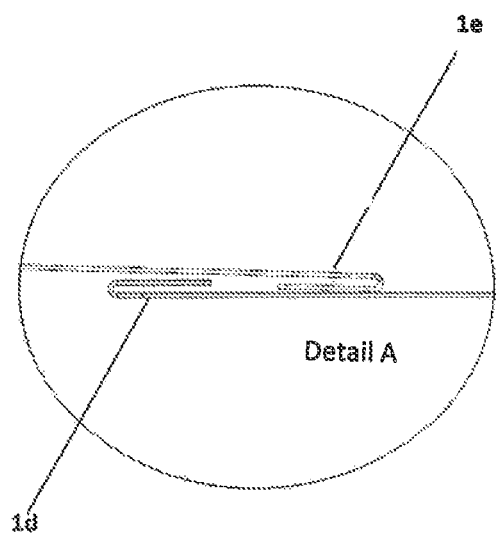
Figure 4:
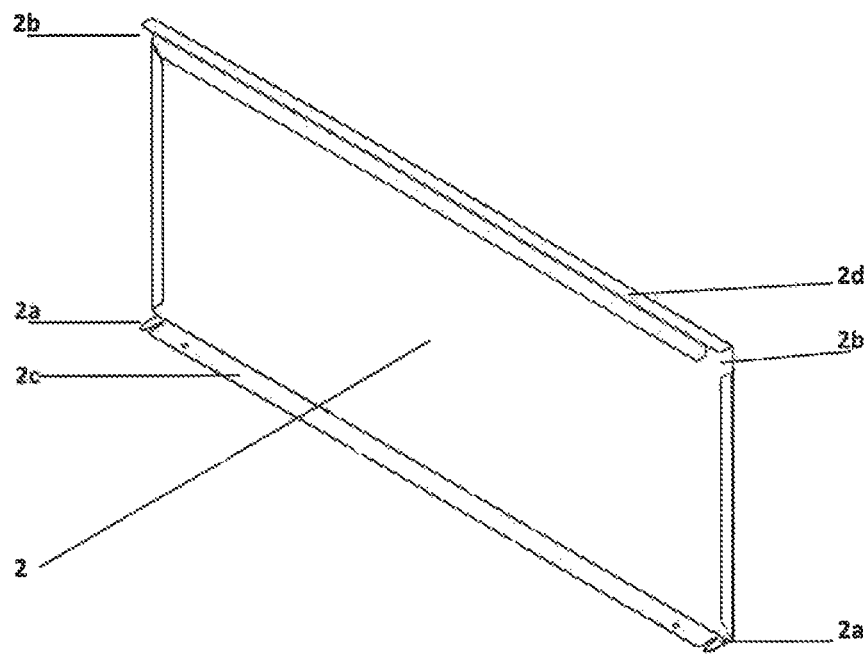
Figure 5:
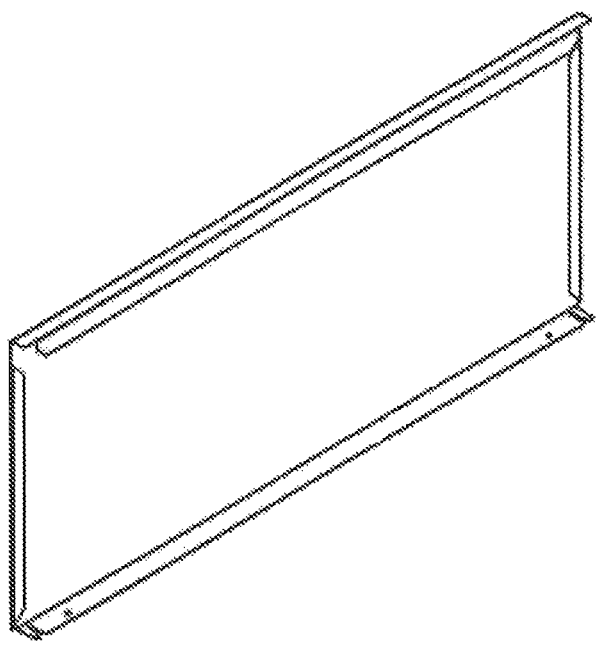
Figure 6:
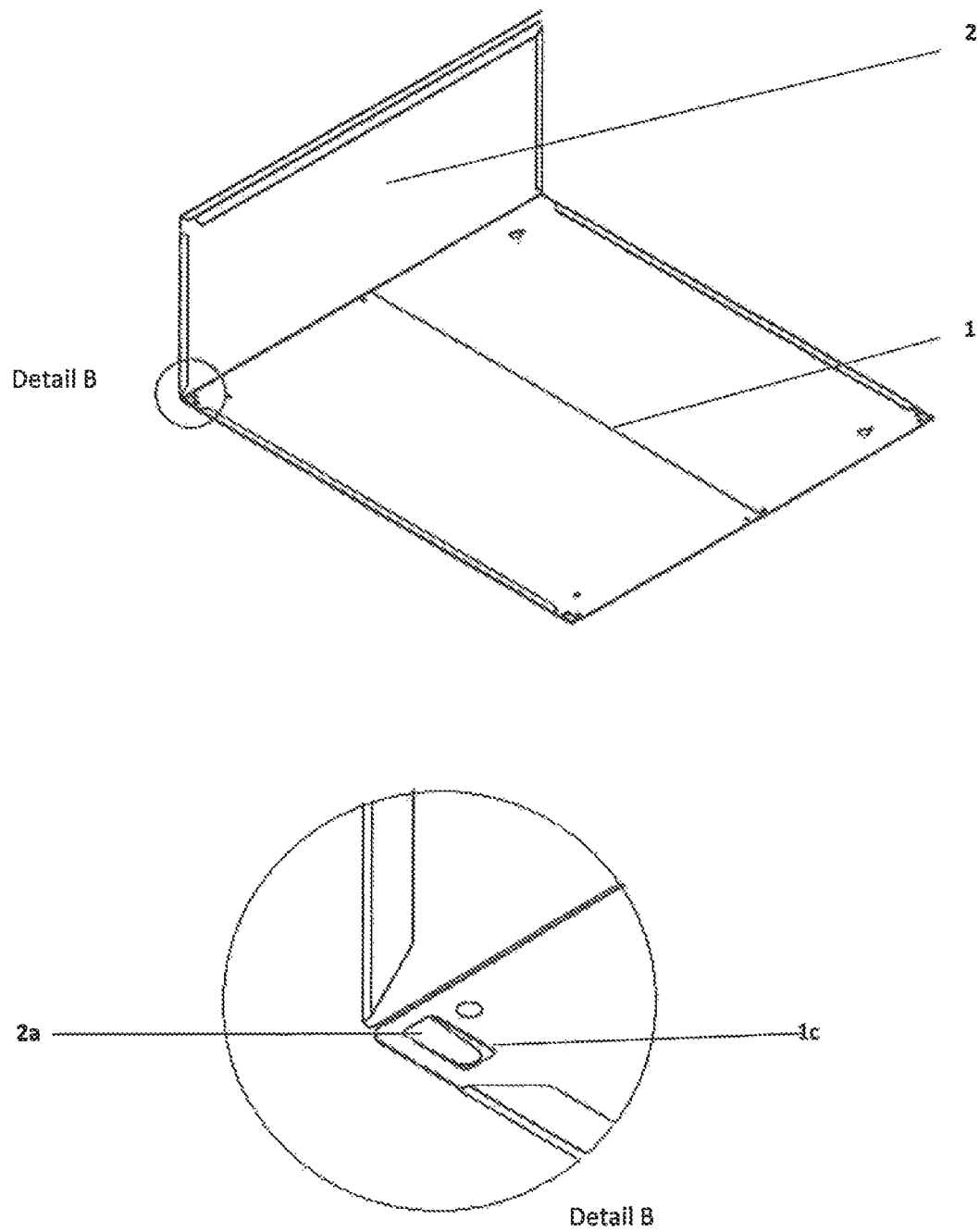
Figure 7:
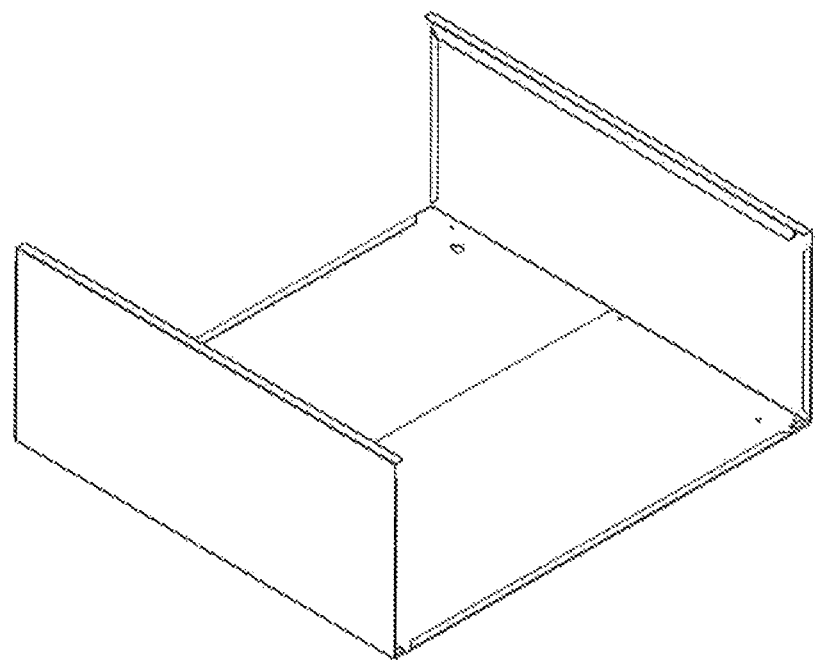
Figure 8:
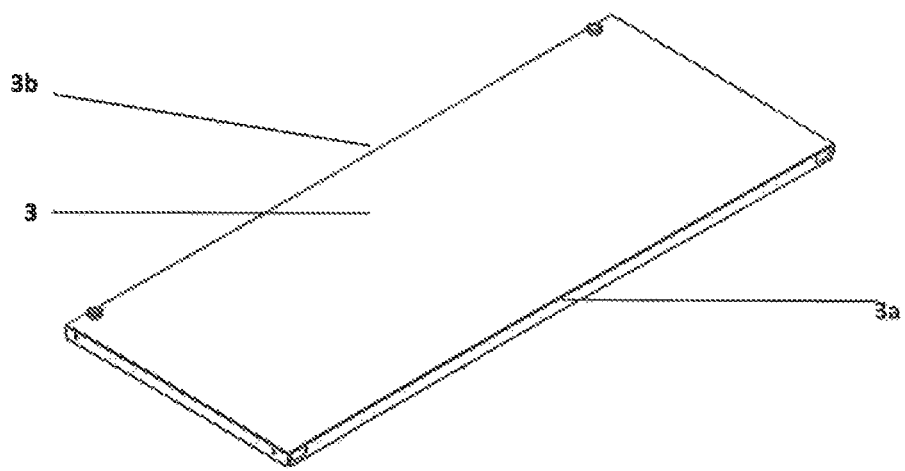
Figure 9:
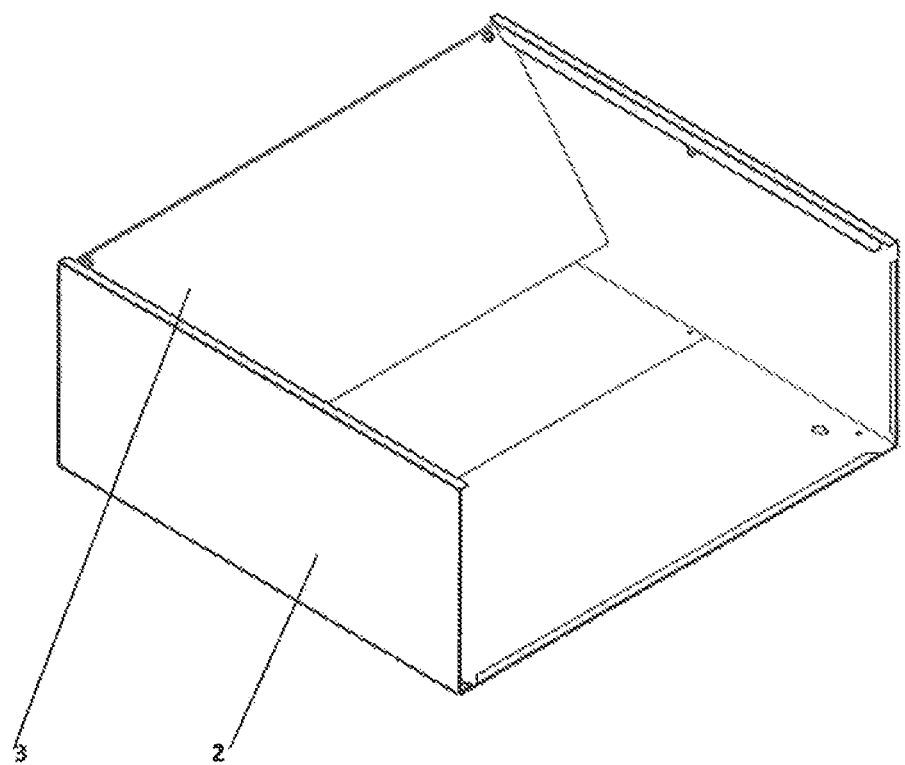
Figure 10:
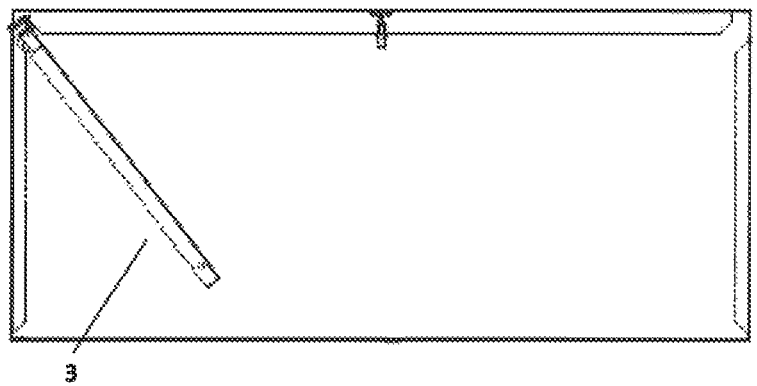
Figure 11:
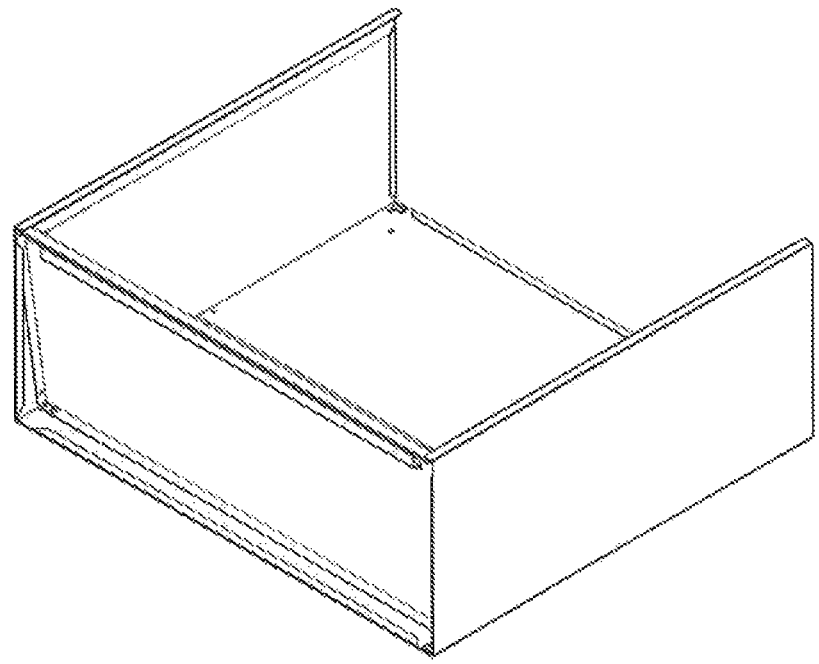
Figure 12:
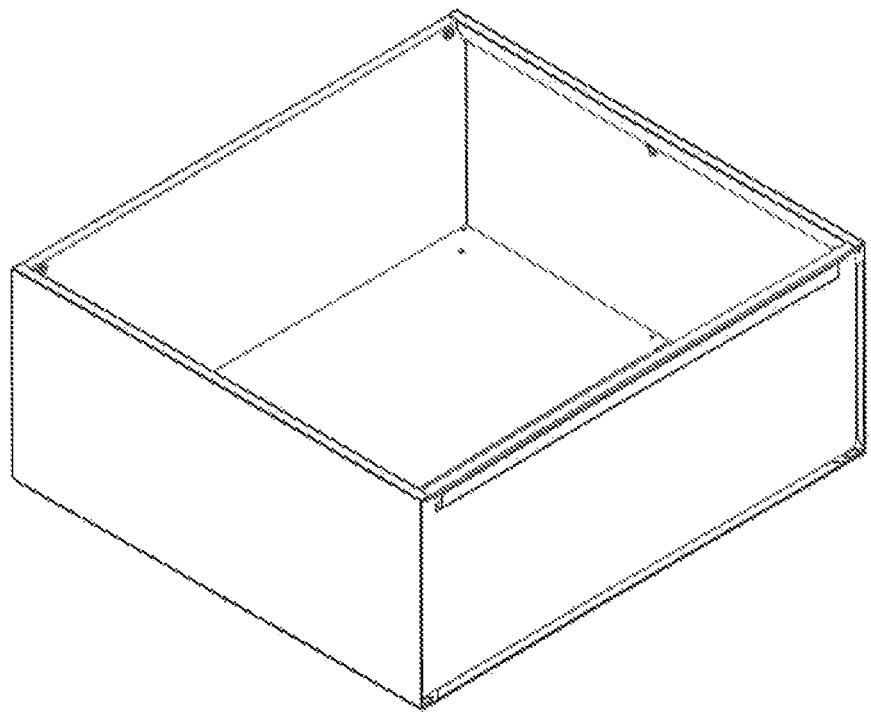
Figure 13:
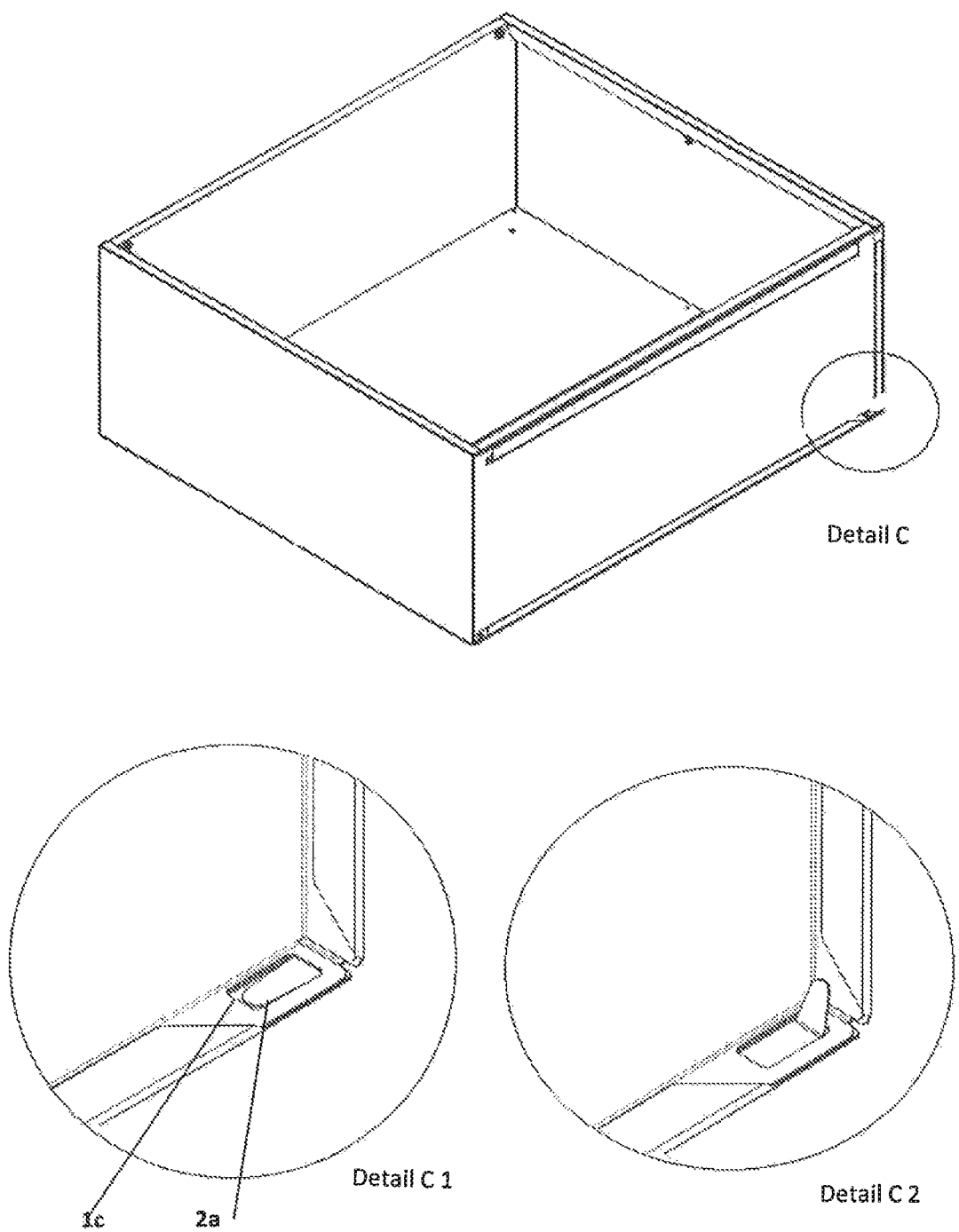

The systems described in the present patent may be seen in the appended figures, wherein:

the FIG. 1 illustrates an view of the upper part of the backside section of the cabinet;

the FIG. 2 illustrates a view of the bottom part of the backside section of the cabinet;

the FIG. 3 illustrates a view of the backside section mounting by fitting the upper and bottom parts one to another in one piece; the detailed view illustrates the fitting of predefined bends;

the FIG. 4 illustrates a view of the left side section of the cabinet;

the FIG. 5 illustrates a view of the right side section of the cabinet;

the FIG. 6 illustrates a view of the sequence of the cabinet side mounting being positioned under the backside part; the detailed view illustrates the fitting of predefined bends;

the FIG. 7 illustrates a view of side sections being fitted to the backside section;

the FIG. 8 illustrates a view of the top or bottom part of the cabinet;

the FIG. 9 illustrates a view of the sequence of the mounting of the upper or bottom part to the backside section lower part and to the side parts;

the FIG. 10 illustrates a view of the sequence of the mounting of the top or bottom part to the upper part of the backside section and to the side parts viewed by another angle;

the FIG. 11 illustrates a view of the sequence of the mounting of the top or bottom part to the upper part of the backside section and to the side parts;

the FIG. 12 illustrates a view of the cabinet box mounted through the mounting sequence of the pieces fit, these pieces already fitted being not locked yet;

the FIG. 13 illustrates a view of the cabinet box with the sequence of the mounting of the corners locking by bending the steel and forming the cabinet box stiff enough to receive the shelf and the doors.

According to the FIGS. 1 to 3, the backside section (1) is bipartite, composed by upper part (1a) and lower part (1b), provided with slots (1c) at the lower and upper ends, the mounting sequence starting by fitting the upper part (1a) to the lower part (1b) in one piece, where the bend angled in 180° (1d) fits to the bend angled in 180° (1e), as Detail A. In FIG. 1, 1× designates an exemplary conventional mounting opening.

According to the FIGS. 4 and 5, each side section (2) contains two tabs (2a) on the corners of its L-shaped lower bend angled in 90° (2c), and two main slots (2b) on the corner of its upper bend having a U-shaped bend (2d).

According to the FIGS. 6 and 7, in the mounting sequence, when the side part (2) is positioned under the backside section (1), the tab (2a) will be placed under the slot (1c) at the four coincident corners, as illustrated in a corner of Detail B.

According to the FIGS. 8 to 11, the cabinet top and/or bottom part (3) presents L-shaped side bend and lower bend angled in 90° (3a) and U-shaped upper bend (3b); the top/bottom part (3) is fitted to the upper section (1d) through its lower bend (3a) and to the side part (2b) through its L-shaped side bends and its U-shaped upper bend (3b).

The mounting sequence of the cabinet box takes place by fitting the pieces still without the shelf and doors, these already fitted pieces being not locked yet, the lower bends (3a) of the top and bottom parts being fitted to the bends angled in 180° (1d) of the backside section (1) and of the side parts (2), as well as the U-shaped upper bends (3b) of the top and bottom parts will be fitted to the main slots (2b) of the side parts (2), the side parts (2) being fitted under the backside section (1), which also receives the top and bottom parts (3), resulting in the cabinet box.

According to the FIGS. 12 and 13, at the four corners where the backside section (1) and the side part (2), and the top or bottom part (3) are fitted one to another, the pieces of the box will be locked, the locking started from manual bending of the tab (2a) being performed by bending the steel, thus forming the cabinet box to receive the shelf and the doors (not shown).

What is claimed is:

1. A system for quick mounting applied to a cabinet body, comprising:

a bipartite backside section (1) having an upper part (1a) and a lower part (1b), the bipartite backside section (1) having slots (1c) formed at lower and upper ends thereof, the upper part (1a) having a 180° angled portion (1d) formed on a lower edge thereof for engaging a corresponding 180° angled portion (1e) formed on an upper edge of the lower part (1b), wherein the 180° angled portion (1d) formed on the lower edge of the upper part (1a) is bent at the lower edge of the upper part (1a) such that the 180° angled portion (1d) does not extend beyond the lower edge of the upper part (1a), and wherein the corresponding 180° angled portion (1e) formed on the upper edge of the lower part (1b) is bent at the upper edge of the lower part (1b) such that the corresponding 180° angled portion (1e) does not extend beyond the upper edge of the lower part (1b);

a pair of side sections (2), wherein each said side section (2) has two tabs (2a) respectively positioned at opposing corners of a lower end thereof, the lower end thereof including an L-shaped portion angled at 90° (2c), each said side section (2) further having two main slots (2b) respectively positioned at opposing corners of an upper end thereof, the upper end thereof including a projecting portion (2d) having a substantially U-shaped bend, wherein each said side section (2) is attached to the bipartite backside section (1), each said tab (2a) being received by a respective one of the slots (1c) such that the pair of side sections (2) are positioned opposite one another with respect to the backside section (1) and are arranged substantially perpendicular with respect to the bipartite backside section (1); and top and bottom parts (3) each having L-shaped side portions, a lower 90° bent angled portion (3a), and a substantially U-shaped, upper bent portion (3b), wherein the top part (3) is attached to the upper part (1a) of the bipartite backside section (1), the 90° bent angled portion (3a) of the top part engaging a 180° angled portion formed on an upper edge of the upper part (1a), the substantially U-shaped upper bent portion (3b) of the top part (3) engaging respective ones of the main slots (2b) of the pair of side sections (2), the L-shaped side portion of the top part respectively engaging the pair of side the bottom part (3) is attached to the lower part (1b) of the bipartite backside section (1), the 90° bent angled portion (3a) of the bottom part engaging a 180° angled portion formed on a lower edge of the lower part (1b), the substantially U-shaped upper bent portion (3b) of the bottom part (3) engaging respective ones of the main slots (2b) of the pair of side sections (2), the L-shaped side portions of the bottom part respectively engaging the pair of side sections.

2. The system for quick mounting applied to a cabinet body according to claim 1, wherein the bipartite backside section (1), the pair of side parts (2), and the top and bottom parts (3) are fitted one to another, wherein locking thereof is performed by bending each said tab (2a).

* * * * *